(12) United States Patent
Fredriksson et al.

(10) Patent No.: US 7,246,677 B2
(45) Date of Patent: Jul. 24, 2007

(54) SAFETY ARRANGEMENT FOR A VEHICLE

(75) Inventors: Rikard Fredriksson, Falköping (SE); Yngve Håland, Falsterbo (SE)

(73) Assignee: Autoliv Development AB, Vargarda (SE)

( * ) Notice: Subject to any disclaimer, the term of this patent is extended or adjusted under 35 U.S.C. 154(b) by 76 days.

(21) Appl. No.: 10/471,250

(22) PCT Filed: Mar. 7, 2002

(86) PCT No.: PCT/SE02/00396

§ 371 (c)(1),
(2), (4) Date: Feb. 9, 2004

(87) PCT Pub. No.: WO02/072392

PCT Pub. Date: Sep. 19, 2002

(65) Prior Publication Data
US 2004/0112664 A1 Jun. 17, 2004

(30) Foreign Application Priority Data
Mar. 13, 2001 (GB) .................................. 0106176.1

(51) Int. Cl.
*B60R 21/34* (2006.01)
(52) U.S. Cl. ................. 180/274; 180/69.2; 296/187.04
(58) Field of Classification Search ................. 180/271, 180/274, 69.2, 69.21; 280/748, 752, 753; 296/187.04
See application file for complete search history.

(56) References Cited

U.S. PATENT DOCUMENTS

| | | | |
|---|---|---|---|
| 4,249,632 A * | 2/1981 | Lucchini et al. | ............ 180/274 |
| 5,409,256 A | 4/1995 | Gordon et al. | |
| 5,445,406 A | 8/1995 | Jones | |
| 5,501,484 A | 3/1996 | Saderholm et al. | |
| 5,560,642 A * | 10/1996 | Davidson et al. | ......... 280/728.2 |
| 5,806,882 A * | 9/1998 | Stein et al. | ............... 280/730.2 |
| 5,839,756 A * | 11/1998 | Schenck et al. | ......... 280/743.1 |
| 5,868,422 A * | 2/1999 | Galbraith et al. | ........... 280/732 |
| 6,364,402 B1 | 4/2002 | Sasaki | |
| 6,439,330 B1 | 8/2002 | Paye | |
| 6,520,276 B2 | 2/2003 | Sasaki et al. | |
| 6,530,449 B2 | 3/2003 | Sasaki et al. | |
| 6,543,086 B2 | 4/2003 | Bjureblad et al. | |

(Continued)

FOREIGN PATENT DOCUMENTS

DE 19721565 * 12/1997

(Continued)

*Primary Examiner*—Paul N. Dickson
*Assistant Examiner*—George D. Spisich
(74) *Attorney, Agent, or Firm*—Madson & Austin

(57) ABSTRACT

A safety arrangement (1) is located beneath the hood or bonnet (3) of a motor vehicle and includes an inflatable element (8) which is formed of a plastically deformable material. A gas generator (14) supplies gas to inflate the element (8) in response to a signal from a sensor (18) which is responsive to impact with a pedestrian. The gas generator (14) passes gas to a chamber (15), and thus through a relatively small aperture (16) to inflate the element (8) with a gradual inflation. If a pedestrian strikes the bonnet, the pedestrian will not deform the bonnet and then be arrested by impact with an engine block or the like, and also the plastically deformable element (8) will deform to absorb energy.

14 Claims, 4 Drawing Sheets

U.S. PATENT DOCUMENTS

| | | |
|---|---|---|
| 6,571,901 B2 | 6/2003 | Lee |
| 6,668,962 B2 * | 12/2003 | Son .......................... 180/274 |
| 6,736,425 B2 | 5/2004 | Lemon et al. |
| 6,758,493 B2 * | 7/2004 | Conlee et al. ............. 280/753 |
| 6,874,811 B2 * | 4/2005 | Enders et al. ........... 280/730.1 |
| 6,938,715 B2 * | 9/2005 | Hamada et al. ............ 180/274 |
| 6,964,316 B1 | 11/2005 | Polz et al. |
| 7,000,720 B2 | 2/2006 | Polz et al. |
| 2003/0121710 A1 | 7/2003 | Hamada et al. |
| 2004/0112664 A1 | 6/2004 | Fredriksson et al. |
| 2004/0124621 A1* | 7/2004 | Knight-Newbury et al. 280/748 |
| 2005/0257980 A1 | 11/2005 | Green et al. |
| 2005/0285431 A1 | 12/2005 | Rex et al. |
| 2006/0060408 A1* | 3/2006 | Kalliske et al. ............ 180/274 |

FOREIGN PATENT DOCUMENTS

| | | | |
|---|---|---|---|
| DE | 19922455 C1 | | 10/2000 |
| DE | 10022094 | * | 12/2001 |
| DE | 10063586 | * | 8/2002 |
| DE | 10247801 | * | 4/2004 |
| DE | WO 2004/108486 | * | 12/2004 |
| GB | 2387577 | * | 10/2003 |
| JP | 07-125604 | * | 5/1995 |
| JP | 07-125607 | * | 5/1995 |
| JP | 08-324380 | * | 12/1996 |
| JP | 10-152018 | * | 6/1998 |
| JP | 11310158 A | | 11/1999 |
| JP | 2004-203062 | * | 7/2004 |
| WO | WO-01/23226 A1 | | 4/2001 |

\* cited by examiner

SAFETY ARRANGEMENT FOR A VEHICLE

BACKGROUND OF THE INVENTION

1. Field of the Invention

THE PRESENT INVENTION relates to a safety arrangement, and more particularly relates to a safety arrangement for a motor vehicle.

2. Description of Related Art

When a motor vehicle, such as a motor car, is involved in an accident in which the front part of the vehicle strikes a pedestrian, it is not uncommon for the head of the pedestrian to be brought forcible into contact with the hood or bonnet of the vehicle. This may cause the hood or bonnet to deform, but, in many cases, that deformation is arrested as the hood or bonnet engages part of the engine block, or other component within the engine compartment, immediately beneath the hood or bonnet. As a consequence, the movement of the head of the pedestrian is suddenly arrested, and the head of the pedestrian is thus subjected to a very severe deceleration, which is undesirable, as severe injuries may arise.

It has been proposed previously to provide one or more inflatable elements located adjacent the rear edge of the hood or bonnet adapted to be inflated in an accident situation of the type described, so that the rear edge of the hood or bonnet is lifted, thus spacing hood or bonnet from the engine block, or other components, within the engine compartment. This enables the head of a pedestrian, if it strikes a hood or bonnet in an accident of the type under consideration, to be decelerated gradually, as the hood or bonnet deforms.

The inflatable elements that have been previous proposed, have been conventional air-bags, which suffer from the disadvantage that they do not remain inflated for a period of time long enough to provide an adequate degree of protection for a pedestrian during a typical accident situation, and also may lead to "bounce" in that when the head of the pedestrian strikes the bonnet, the down-force provided to the hood or bonnet by the pedestrian, will re-compress the gas present within the inflated air-bag, which will then exert a resilient up-force on a hood or bonnet, causing a hood or bonnet to move upwardly which will serve to increase the forces applied to the head of the pedestrian.

SUMMARY OF THE INVENTION

The present invention seeks to provide an improved safety arrangement.

According to one aspect of this invention there is provided a safety arrangement for a motor vehicle having a hood or bonnet, the safety arrangement comprising an inflatable element formed at least partly of plastically deformable material dimensioned and adapted to be located under the rear part of the hood or bonnet, between the rear part of the hood or bonnet and a fixed part of the vehicle, means being provided to supply inflating gas to the inflatable element so that, on inflation of the inflatable element, the rear part of the hood or bonnet will be lifted.

According to another aspect of this invention there is provided a safety arrangement in a motor vehicle having a hood or bonnet, the safety arrangement comprising the inflatable element formed at least partially of a plastically deformable material, the inflatable element being mounted in position between the fixed part of the vehicle and the rear part of the bonnet, means being provided to supply gas to the inflatable element so that, on inflation thereof, the rear part of the bonnet will be lifted.

Conveniently the rear part of the hood or bonnet is secured to the vehicle by means of one or more releasable catches, means being provided to actuate the or each releasable catch in response to the inflation of the inflatable element.

Advantageously an element is provided extending from part of the inflatable element to the or each said catch to release the or each said catch on inflation of the inflatable element.

Conveniently the inflatable element comprises a housing defining a base and a top, the base and the top being interconnected by a side wall formed of plastically deformable material so that, on inflation of the inflatable element, the top will move away from the base with a deformation of the side wall.

Preferably the side wall is in the form of a cylindrical sleeve, the cylindrical sleeve being provided with corrugations.

Advantageously the means to supply inflating gas are adapted to supply gas through a throttle defining a gas flow path of a predetermined cross-sectional area.

Conveniently the means to supply gas comprises a gas generator adapted to generate gas, the gas generator communicating with a chamber within the inflatable element, the chamber being provided with an aperture constituting said gas throttle.

Preferably both the gas generator and the chamber are located within the interior of the inflatable element.

Advantageously the inflatable element is provided with means for securing the inflatable element to the motor vehicle.

In one embodiment the securing means comprise apertures formed in part of the inflatable element to receive fastening means.

In an alternative embodiment the mounting means comprise screw-thread means provided on the inflatable element.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE INVENTION

Figure 1:
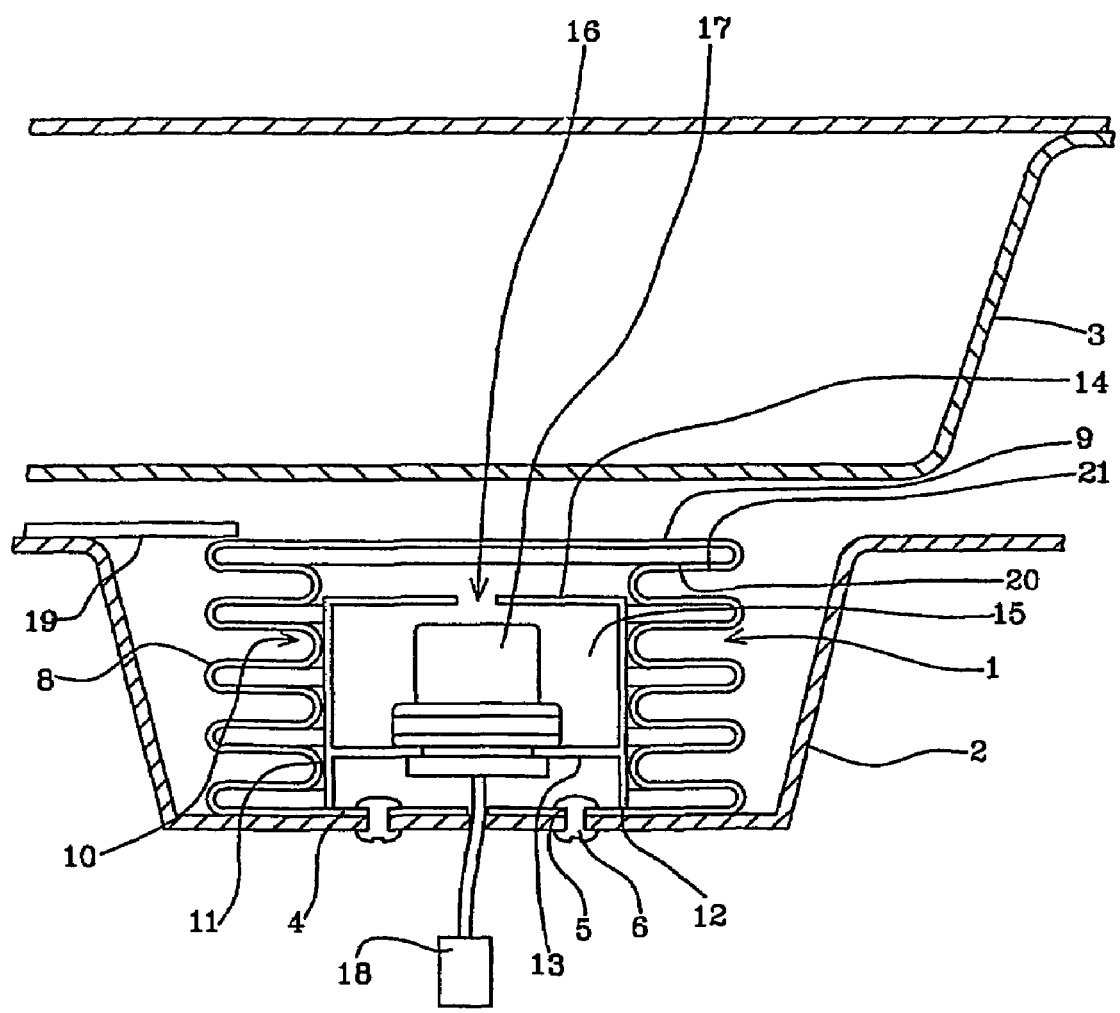
FIG. 1 is a diagrammatic sectional view of a safety arrangement in accordance with the invention.

Referring initially to FIG. 1 of the accompanying drawings, a safety arrangement in accordance with the present invention comprises an inflatable housing 1 which is located between a fixed part 2 of the chassis of the vehicle, and the rear edge 3 of a hood or bonnet.

The housing 1 comprises a base 4, the base 4 being provided with a plurality of apertures 5 adapted to receive appropriate fastening means such as rivets 6 or the like to secure the housing in position on the fixed part 2 of the chassis. The base 4 is formed integrally with, or secured, in a gas-tight manner, to a cylindrical outer wall or sleeve 8. The cylindrical outer wall or sleeve 8 is provided with a plurality of corrugations. The corrugations may be provided by pressure forming the cylindrical sleeve within an appropriate die, for example by using hydrostatic pressure, or, alternatively, by utilising co-operating wheels or rollers which engage the interior and exterior surfaces of the sleeve 8 as the sleeve is rotated.

The sleeve 8 is made of a plastically deformable material such as, for example, metal, in the form of steel. Other plastically deformable materials may be used.

The upper end of the sleeve 8 is provided with a closure plate 9, which is secured to the upper end of the sleeve 8 in a gas-tight manner.

Contained within the housing 1 is an inner housing 10. The inner housing 10 comprises a cylindrical wall 11, the lower end of which is secured in a gas-tight manner 12 to the base 4 of the housing 1, at a position between the lower end of the sleeve 8 and the fixing apertures 5. A transverse wall 13 is provided which extends across the interior of the cylindrical wall 11. The upper part of the cylindrical wall 11 is provided with a closure 14 so that a chamber 15 is defined between the wall 13 and the closure 14, that chamber being bounded by the upper part of the cylindrical wall 11. The closure 14 is provided with a small aperture 16 therein, and the wall 13 supports a gas generator 17 which is adapted, on actuation, to inject gas into the chamber 15. The aperture 16 defines a gas flow path of a predetermined cross-sectional area.

A sensor 18 is provided which may, for example, be mounted on the front bumper of the motor vehicle, adapted to sense an impact between the vehicle and the pedestrian. The sensor is connected to the gas generator 17 so that when an impact with a pedestrian is sensed, the gas generator 17 is activated.

A wire cable or lever 19 may be provided, one end of which is connected to an appropriate point on the housing 1, the other end of the wire or cable being connected to a releasable catch, which may be associated with a hinge, which, when released, effectively releases the rear edge of the hood or bonnet 3 to enable the rear edge or bonnet 3 to move upwardly.

In the embodiment illustrated, the sleeve 8 is provided with a line 20 of mechanical weakness which defines a flap 21.

In the event that the sensor 18 senses an impact with a pedestrian, the gas generator 17 is actuated, and gas is injected into the chamber 15. The gas leaves the chamber 15 through the relatively small aperture 16 which acts as a gas throttle, and the gas enters the interior of the housing 1, thus causing the cylindrical sleeve 8 to expand. The housing 1 thus acts as an inflatable element. The sleeve expands axially as the corrugations in the sleeve 8 open out, so that the upper closure plate 9 moves away from the base plate 4. As the gas from the gas generator passes through the aperture 16, the housing 1 expands in a manner which is more gradual than if the chamber 15 and aperture 16 were not provided.

Figure 2:
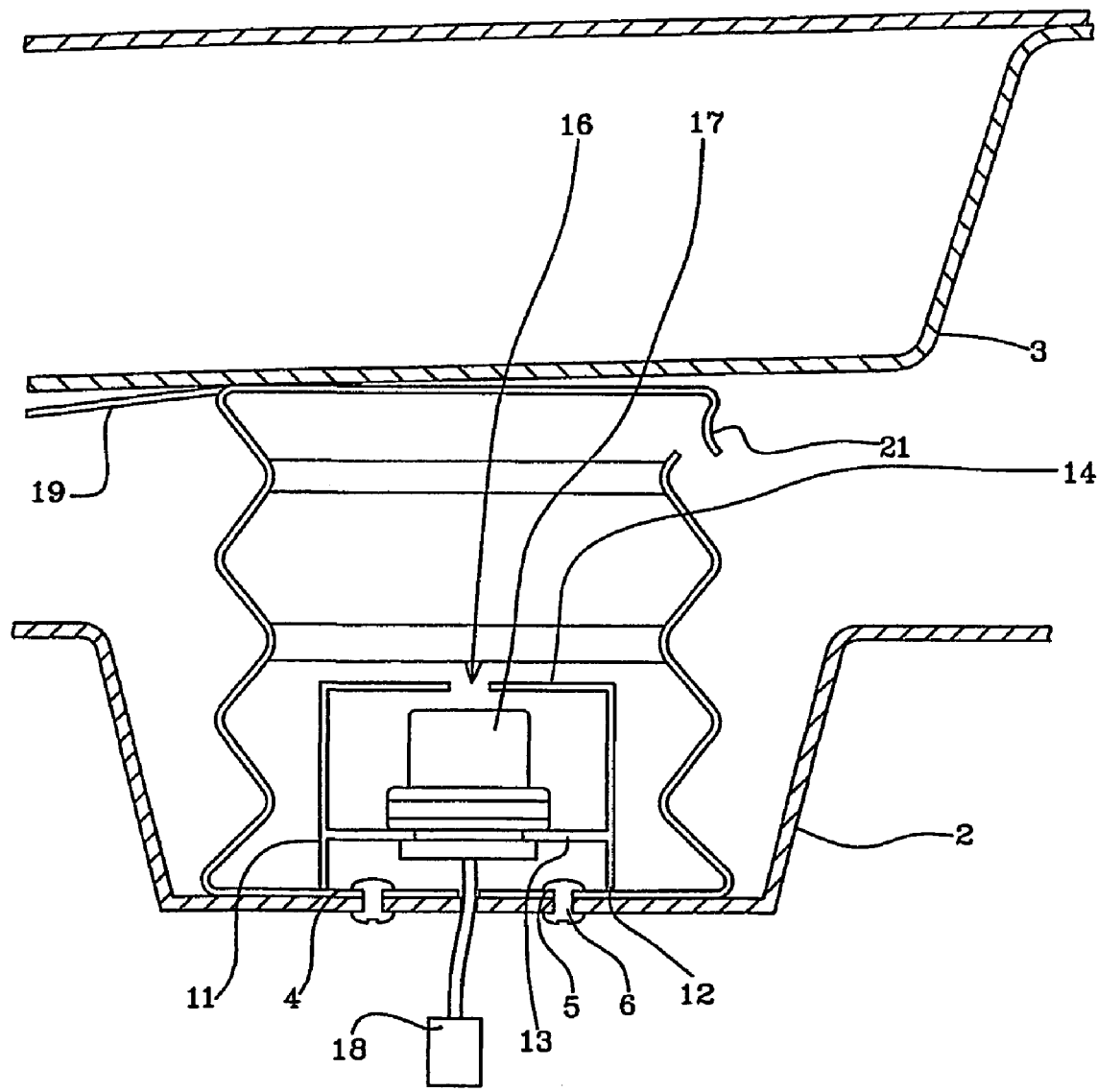
FIG. 2 is a view corresponding to FIG. 1 showing the safety arrangement of FIG. 1 after an accident has been detected.

As the housing 1 expands, so the rear edge of the hood or bonnet 3 is lifted, to a position as shown in FIG. 2, and if the head of the pedestrian should strike the middle of the hood or bonnet, the middle bonnet will deform, gradually decelerating the head of the pedestrian, without that deceleration being arrested by engagement of the under-surface of the hood or bonnet, with the engine block or other component within the engine compartment.

As the gas pressure in the fully expanded housing 1 exceeds a threshold, the flap 21, as defined by the line of mechanical weakness opens, and gas within the chamber 1 can escape.

Figure 3:
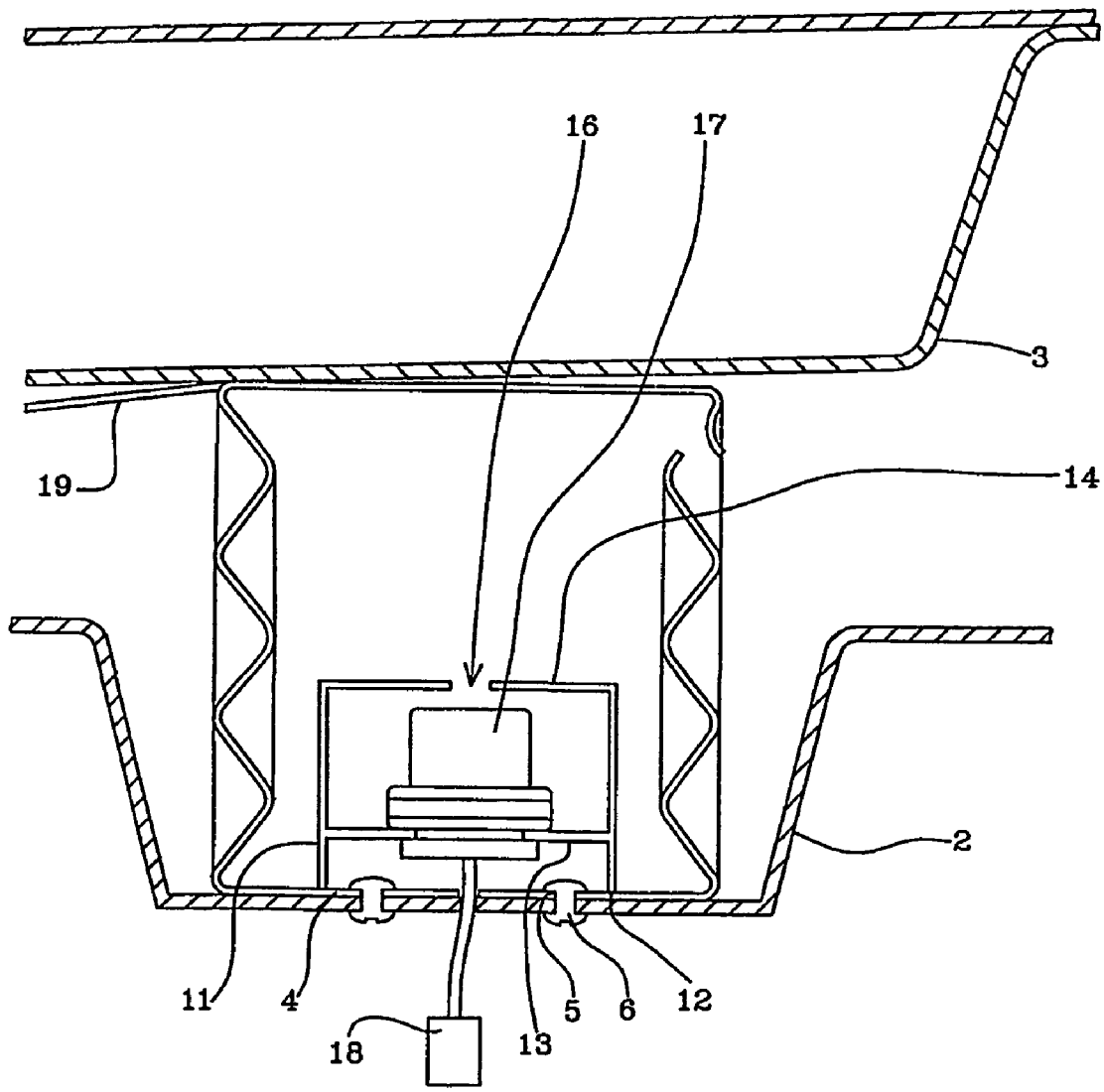
FIG. 3 is a view corresponding to FIG. 2 showing the safety arrangement after the conclusion of an accident.

As the head of the pedestrian strikes the hood or bonnet, a downward force will be applied to the hood or bonnet which will cause the extended sleeve 8 to be at least partially re-compressed or collapsed with a consequence of absorption of energy of the plastically deformable material forming the sleeve 8 is again deformed. As the flap 21 is open, the re-compressing of the sleeve 8 will not re-compress the gas, and thus will not lead to "bounce". This is the position shown in FIG. 3.

In use of the described embodiment of the invention, because the housing 1 only extends relatively slowly, there is only a minimum risk that the hood or bonnet will be accelerated in such a way that the actual movement of the hood or bonnet will cause injury to the pedestrian, should the pedestrian be in such a position that rapid movement of the hood or bonnet would cause such injury. Also, the relatively slow movement of the housing will minimise the risk that the hood or bonnet will itself be deformed in the region of the chamber. Whilst, in an accident situation, the hood or bonnet may well be sufficiently damaged by the impact with the pedestrian that replacement of the hood or bonnet is appropriate, if the described safety device should be triggered inadvertently, for example by actuation of the sensor 18 as a consequent of an impact during parking of the vehicle, it would be inconvenient if the hood or bonnet had to be replaced due to deformation thereof. It is envisaged that if the preferred embodiment of the invention were triggered in such a situation, it would only be necessary to replace the described housing.

A further advantage of the preferred embodiment of the invention is that the housing is made of metal, and thus does not deteriorate, even if subjected to a potentially oily and dirty environment. Because the housing is totally sealed from the exterior, the interior of the housing is sealed from the dirt and hostile environment.

Figure 4:
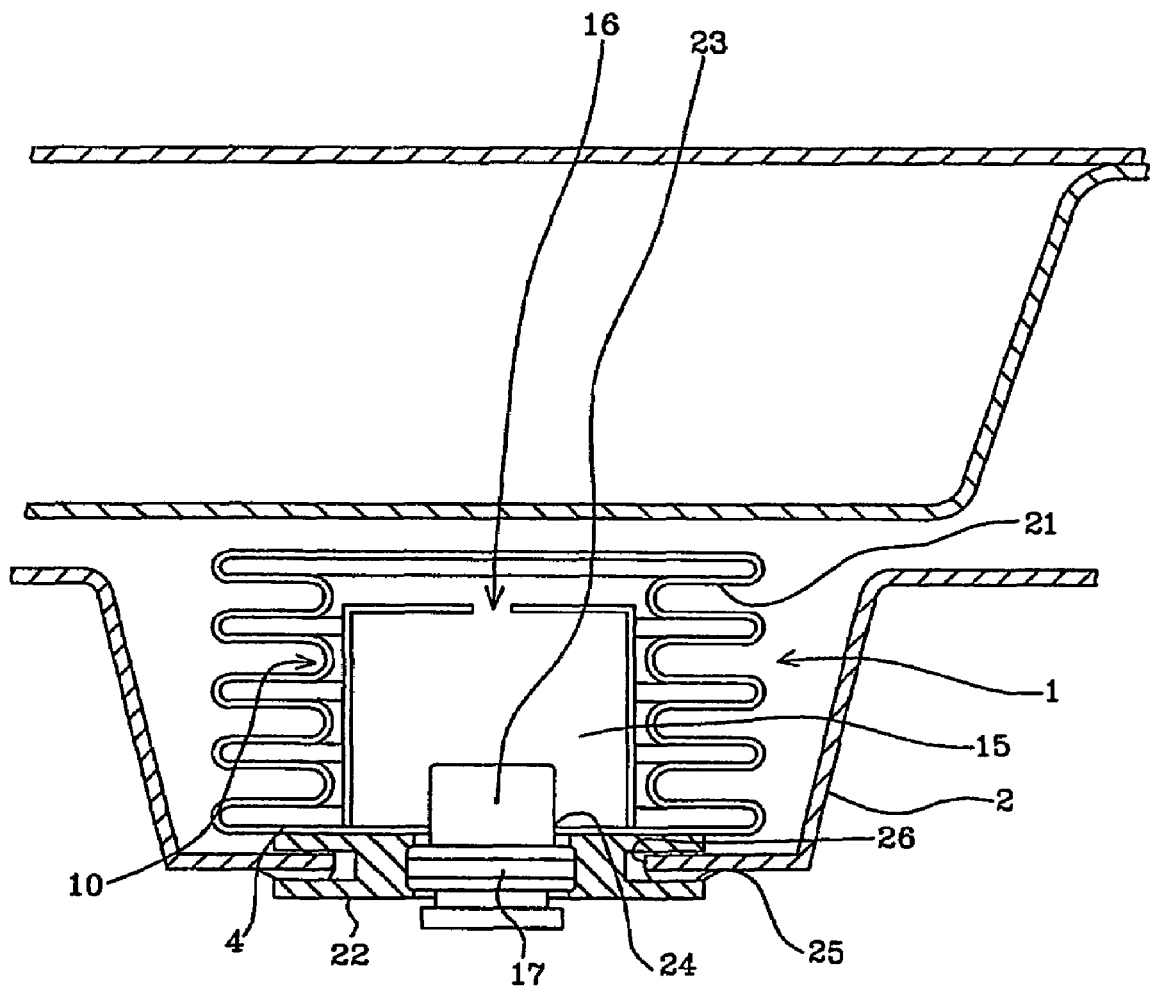
FIG. 4 is a view corresponding to FIG. 1 showing another embodiment of the invention.

Referring now to FIG. 4, a modified embodiment of the invention is illustrated.

In this embodiment of the invention the housing 1 contains an inner housing 10 which defines a chamber 15 provided with the small aperture 16 to act as a gas throttle. However, in this embodiment of the invention, the base 4 of the housing 1 is mounted on a support plate 22. The support plate 22 supports the main part of the gas generator 17, and the gas emitting part 23 of the gas generator extends into the chamber 15 through an aperture 24 formed in the base 4 of the housing 1. The combination of the gas generator 17 and the base plate 22 constitutes a gas-tight seal. The base plate 22 is provided, at its periphery, with screw-threading 25 so that the base plate may be screwed into a screw-threaded aperture 26 formed in the fixed part 2 of the chassis of the vehicle.

The embodiment shown in FIG. 4 may operate in precisely the same way as that described above with reference to FIGS. 1 to 3, but, at the conclusion of an accident, the housing 1 may be removed from the vehicle simply by unscrewing it from the illustrated position.

In the present Specification "comprise" means "includes or consists of" and "comprising" means "including or consisting of".

The invention claimed is:

1. A safety arrangement for a motor vehicle having a hood or bonnet, the safety arrangement comprising an inflatable element formed at least partly of plastically deformable material dimensioned and adapted to be located under the rear part of the hood or bonnet, between the rear part of the hood or bonnet and a fixed part of the vehicle, means being provided to supply inflating gas to the inflatable element, wherein the means to supply inflating gas are adapted to supply gas through a throttle defining a gas flow path of a predetermined cross-sectional area, wherein the means to supply gas comprises a gas generator adapted to generate gas, the gas generator communicating with a chamber within the inflatable element, the chamber being provided with an aperture constituting said gas throttle.

2. A safety arrangement in a motor vehicle having a hood or bonnet, the safety arrangement comprising an inflatable element formed at least partially of a plastically deformable material, the inflatable element mountable in position between a fixed part of the vehicle and a rear part of the bonnet, means being provided to supply gas to the inflatable element, wherein the means to supply inflating gas are adapted to supply gas through a throttle defining a gas flow path of a predetermined cross-sectional area, wherein the means to supply gas comprises a gas generator adapted to generate gas, the gas generator communicating with a chamber within the inflatable element, the chamber being provided with an aperture constituting said gas throttle.

3. An arrangement according to claim 2 wherein the inflatable element comprises a housing defining a base and a top, the base and the top being interconnected by a side wall formed of plastically deformable material so that, on inflation of the inflatable element, the top will move away from the base with a deformation of the side wall.

4. An arrangement according to claim 3 wherein the side wall is in the form of a cylindrical sleeve, the cylindrical sleeve being provided with corrugations.

5. An arrangement according to claim 2 wherein both the gas generator and the chamber are located within the interior of the inflatable element.

6. An arrangement according to claim 2 wherein the inflatable element is provided with means for engaging a securing element that secures the inflatable element to the motor vehicle.

7. An arrangement according to claim 6 wherein the means for engaging comprise apertures formed in part of the inflatable element to receive fastening means.

8. A safety arrangement for a motor vehicle, comprising:
an inflatable element formed at least partially of a plastically deformable material, the inflatable element sized to be mounted underneath a rear portion of a vehicle hood; and
a gas generator for supplying inflation gas to the inflatable element, wherein the means to supply inflating gas are adapted to supply gas through a throttle defining a gas flow path of a predetermined cross-sectional area, wherein the means to supply gas comprises a gas generator adapted to generate gas, the gas generator communicating with a chamber within the inflatable element, the chamber being provided with an aperture constituting said gas throttle.

9. An arrangement according to claim 8, wherein the plastically deformable material is metal.

10. An arrangement according to claim 8, wherein the inflatable element comprises a housing defining a base and a top, the base and the top being interconnected by a side wall formed of plastically deformable material, such that on inflation of the inflatable element, the top will move away from the base with a deformation of the side wall.

11. An arrangement according to claim 8, wherein the inflatable element comprises a chamber for receiving the inflation gas supplied by the gas generator, the chamber having an aperture shaped as a gas throttle defining a gas flow path of a predetermined cross-sectional area.

12. An arrangement according to claim 8, wherein the inflatable element is attached to a means for engaging securing elements to allow the inflatable element to be secured to the vehicle.

13. An arrangement according to claim 12, wherein the means for engaging securing elements is a threaded portion for engaging correspondingly sized threads on the vehicle.

14. An arrangement according to claim 8, wherein the inflatable element has means for engaging securing elements to allow the inflatable element to be secured to the vehicle, wherein the means for engaging securing elements comprises at least one aperture formed in the inflatable element for receiving at least one fastener.

* * * * *